US007793989B2

(12) United States Patent
Pinckney, Jr.

(10) Patent No.: US 7,793,989 B2
(45) Date of Patent: Sep. 14, 2010

(54) LOCKING CONNECTOR WITH DEPRESSIONS

(76) Inventor: Robert Pinckney, Jr., 121 W. Lake Rd., Penn Yan, NY (US) 14527

( * ) Notice: Subject to any disclaimer, the term of this patent is extended or adjusted under 35 U.S.C. 154(b) by 521 days.

(21) Appl. No.: 11/844,089

(22) Filed: Aug. 23, 2007

(65) Prior Publication Data

US 2008/0036210 A1    Feb. 14, 2008

Related U.S. Application Data

(63) Continuation-in-part of application No. 11/252,699, filed on Oct. 18, 2005, now abandoned, which is a continuation-in-part of application No. 10/891,399, filed on Jul. 14, 2004, now Pat. No. 7,506,901.

(51) Int. Cl.
*F16L 15/08* (2006.01)
(52) U.S. Cl. .................. 285/92; 285/386; 285/390; 285/391; 411/311
(58) Field of Classification Search .................. 285/92, 285/386, 389, 390, 391, 354, 387, 388; 411/311, 411/366.1, 366.3
See application file for complete search history.

(56) References Cited

U.S. PATENT DOCUMENTS

| | | | |
|---|---|---|---|
| 2,301,181 A | 11/1942 | Ilsemann | |
| 2,788,045 A | 4/1957 | Rosan | |
| 2,788,046 A | 4/1957 | Rosan | |
| 2,864,629 A | 12/1958 | Hall, Sr. | |
| 3,176,746 A | 4/1965 | Walton | |
| 3,425,314 A | 2/1969 | Ohlson | |
| 3,517,717 A | 6/1970 | Orlomoski | |
| 3,633,944 A * | 1/1972 | Hamburg | 285/81 |
| 3,721,283 A | 3/1973 | Evans | |
| 3,762,745 A * | 10/1973 | Cunningham | 285/92 |
| 3,813,115 A * | 5/1974 | French | 285/92 |
| 3,850,215 A | 11/1974 | Orlomoski | |
| 3,885,613 A | 5/1975 | Evans | |
| 4,252,168 A | 2/1981 | Capuano | |
| 4,273,175 A | 6/1981 | Capuano | |
| 4,586,861 A | 5/1986 | McKewan | |
| 5,101,906 A * | 4/1992 | Carlin et al. | 166/380 |
| 5,282,707 A | 2/1994 | Palm | |
| 5,360,240 A | 11/1994 | Mott | |
| 5,393,104 A * | 2/1995 | Zornow | 285/40 |
| 5,538,378 A | 7/1996 | Van Der Drift | |
| 5,672,037 A | 9/1997 | Iwata | |
| 5,944,465 A | 8/1999 | Janitzki | |
| 6,102,639 A | 8/2000 | DiStasio | |
| 6,149,650 A | 11/2000 | Michelson | |
| 6,190,101 B1 | 2/2001 | Janitzki | |
| 6,334,632 B1 * | 1/2002 | Nishio et al. | 285/92 |
| 6,442,793 B1 * | 9/2002 | Paterson et al. | 15/410 |
| 6,447,227 B1 | 9/2002 | Crutchley | |
| 6,474,511 B1 | 11/2002 | Antal, Sr. | |
| 6,582,432 B1 | 6/2003 | Michelson | |

(Continued)

*Primary Examiner*—James M Hewitt
(74) *Attorney, Agent, or Firm*—Hiscock & Barclay, LLP

(57) ABSTRACT

A self-locking threaded connection including an externally threaded male part having a hollow center and a series of cooperating members; and an internally threaded female part having a series of cooperating members; the cooperating members consisting of projections and detents. As the parts are threaded together, the reception of the projections into the detents produces both audio and tactile responses indicating that the connection is made and near a destructive over tightening.

16 Claims, 5 Drawing Sheets

U.S. PATENT DOCUMENTS

| | | | |
|---|---|---|---|
| 6,688,651 B2 * | 2/2004 | Min-cheol | 285/92 |
| 6,905,142 B2 * | 6/2005 | Do et al. | 285/89 |
| 6,974,289 B2 * | 12/2005 | Levey et al. | 411/310 |
| 7,246,979 B2 * | 7/2007 | Fujii et al. | 411/310 |
| 7,506,901 B2 * | 3/2009 | Pinckney | 285/390 |
| 7,578,043 B2 * | 8/2009 | Simpson et al. | 29/522.1 |
| 2002/0089176 A1 * | 7/2002 | Iwasaki | 285/92 |
| 2003/0155768 A1 | 8/2003 | Hollingsworth et al. | |
| 2003/0160449 A1 * | 8/2003 | Min-Cheol | 285/322 |
| 2004/0056481 A1 * | 3/2004 | Do et al. | 285/92 |
| 2006/0012173 A1 | 1/2006 | Pinckney, Jr. | |
| 2006/0033333 A1 | 2/2006 | Pinckney, Jr. | |

* cited by examiner

LOCKING CONNECTOR WITH DEPRESSIONS

CROSS-REFERENCE TO RELATED APPLICATIONS

This application is a Continuation-in-Part of U.S. Ser. No. 11/252,699 filed Oct. 18, 2005, now abandoned, which is a Continuation-in-Part of U.S. Ser. No. 10/891,399 filed Jul. 14, 2004, now U.S. Pat. No. 7,506,901, and their entire contents are hereby incorporated by reference.

FIELD OF THE INVENTION

This invention relates generally to a threaded connector, and more particularly but not by way of limitation, to a threaded connector that is self-locking as may be used either alone, or in combination with plumbing fixtures including but not limited to plumbing pipes and in particular to plumbing pipes subject to vibration such as garbage disposal drains and the like.

BACKGROUND OF THE INVENTION

Manufactures have long used various sorts of connections to assure a tight connection that can be undone if necessary, especially in the plumbing industry. Often two pipes are joined together permanently using piping dope or other forms of permanent adhesive that effectively form a plastic "weld." These sorts of connections are quick and easy to make and do not require the exact tolerances that may be required for threaded connections. A disadvantage of this type of connection is that it is permanently welded in order to prevent fluid leaks. Thus, when there is a need to repair the plumbing the connecting pipes must be cut.

Alternatively, if the plumbing connection is a threaded connection then gaskets, doping materials or other nonpermanent fluid sealing agents may be employed to assist the threads in making a fluid tight joint. A threaded connection is easily undone to make a repair or to replace one or more plumbing components or fixtures. Threaded connections often use a top lip to hold one pipe against another pipe often with the help of a gasket. However, even when there are in no internal pressures, as in a drain line, it may be difficult to make a threaded connection that forms a fluid tight seal and maintains a fluid tight seal over time.

This is particularly the case if the plumbing is subjected to vibration, such as the drain from a sink drain, garbage disposal or dishwasher. In such cases the threaded connection may become loosened over time allowing leakage. Hence, plumbing connections in such situations are often over tightened in the attempt to make a tight seal. As it is not uncommon for drains such as sink drains and the like to be formed of plastics (such as PVC), over tightening may result in fractured or broken parts. Over tightened joints are also not easily disassembled or undone when needed. The following invention overcomes these problems by providing a threaded connector that is self-locking when the proper seal connection is made. The self-locking feature makes it difficult to over tighten a plumbing connection that needs to be fastened to a specific tightness and allows for ease of disassembly to undo the connection.

SUMMARY OF THE INVENTION

The invention includes components of a threaded connection, including a male part having external threads and a female part with internal threads. The male part has one or more cooperating members located such that when the female and male parts are mated together in a proper sealing relationship, the cooperating members on the male part mate with and releasably lock with the cooperating members on the female part to resist loosening of the threaded joint.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
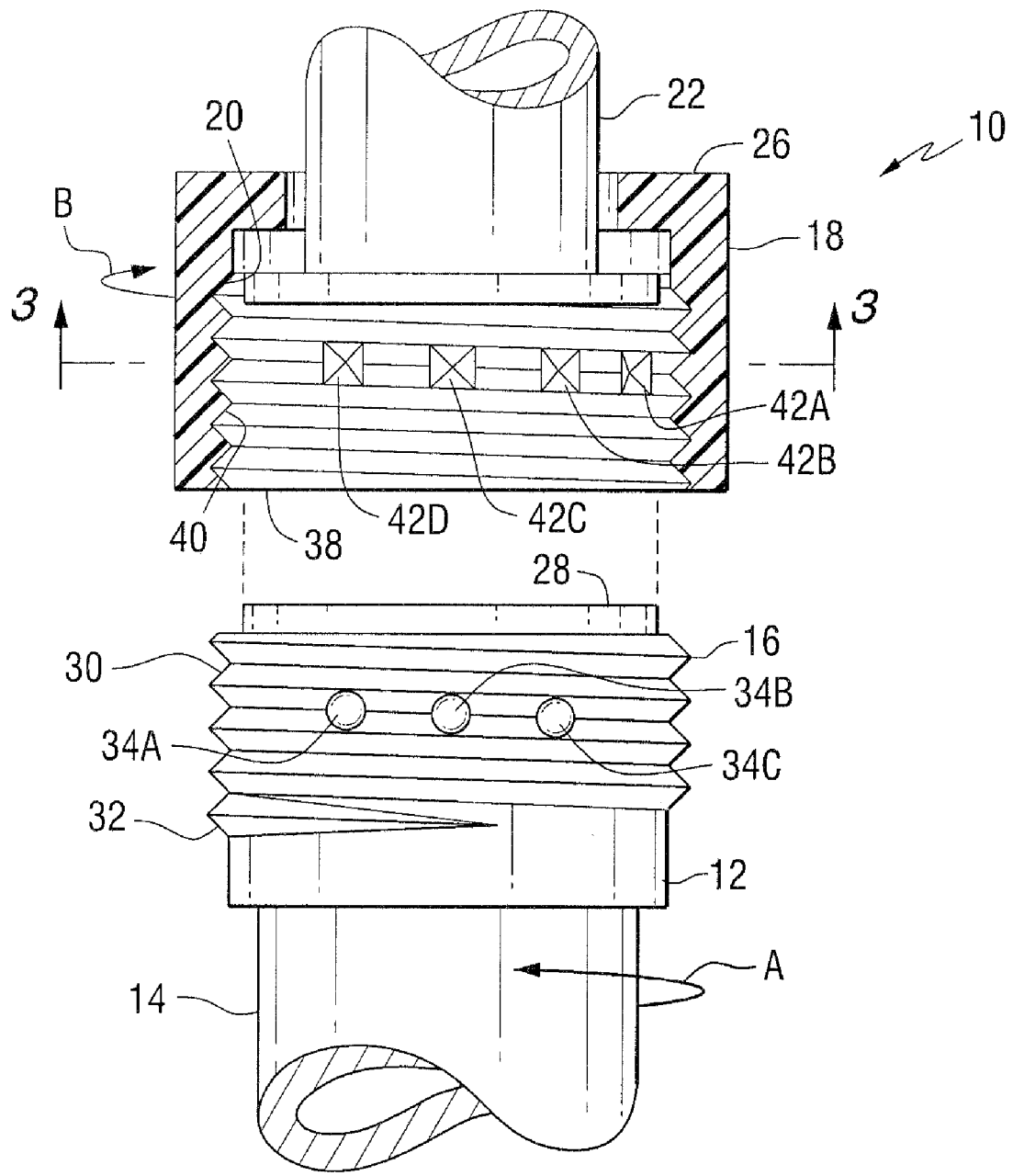
FIG. 1 is a front elevation view partly broken away and in section showing components of the self lock threaded coupling of the present invention prior to assembly.

Referring to FIGS. 1-4, there is shown the coupling of the present invention generally indicated at 10. The coupling includes a male part 12 comprising a pipe section 14 having exterior threads 16 at one end and a female part 18 having internal threads 20. The female part 18 is threaded to the external threads 16 on the male part so as to couple the threaded pipe section 22 to the pipe section 14.

Figure 2:
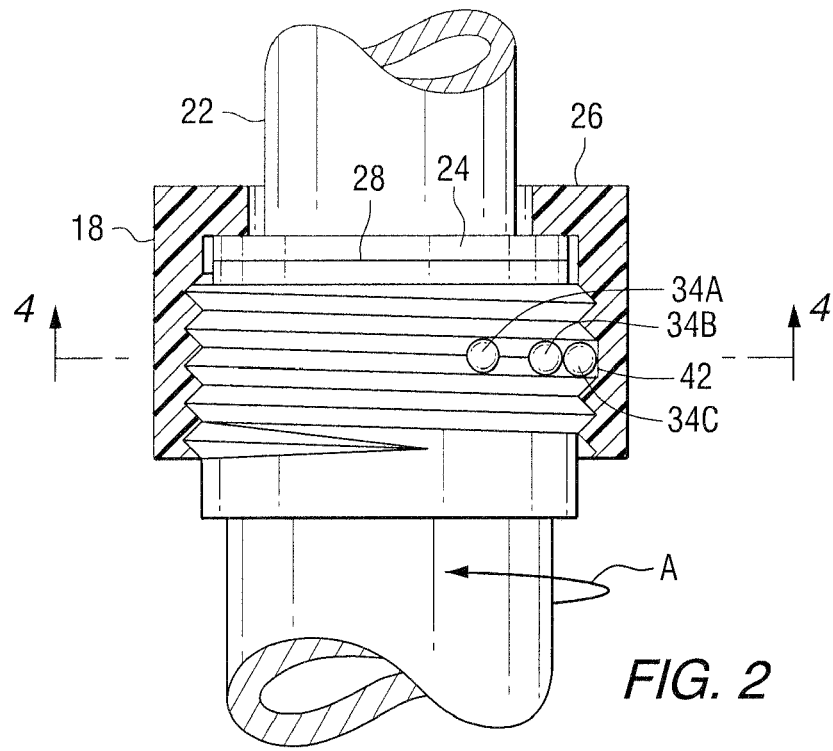
FIG. 2 is a side elevation view of the coupling partly broken away and in section showing the coupling as assembled.

In this respect the unthreaded pipe section has a flat flange 24 that is engaged by a collar 26 on the female part and pressed against an end face 28 of the male part upon threading the male and female parts together (see FIG. 2). Such a connection is common in plumbing fixtures such as in sink drains and the like.

Plumbing connections of the type described are not usually employed in situations where there is an internal pressure. Accordingly, making the connection finger tight usually is sufficient to prevent leakage through the joint. In some cases a gasket (not shown) is inserted between the flange 24 and the end face 26.

The male part 12 has an entry threaded portion 30 on a leading end and a trailing or last-to-be-engaged threaded portion 32. Along the external threads 16 are a series of projections 34. At least one projection 34 is located between the entry threaded portion 30 and the trailing or last-to-be-engaged threaded portion 32. It is understood that at least one projection may be positioned adjacent to the external threads 16 in advance of the entry threaded portion 30 or trailing the last-to-be-engaged threaded portion 32 in the direction of rotation (Arrow A). In one embodiment there are three projections. The projections can either be fixedly imbedded into the wall structure of the male part or formed integral with the wall structure.

Figure 3:
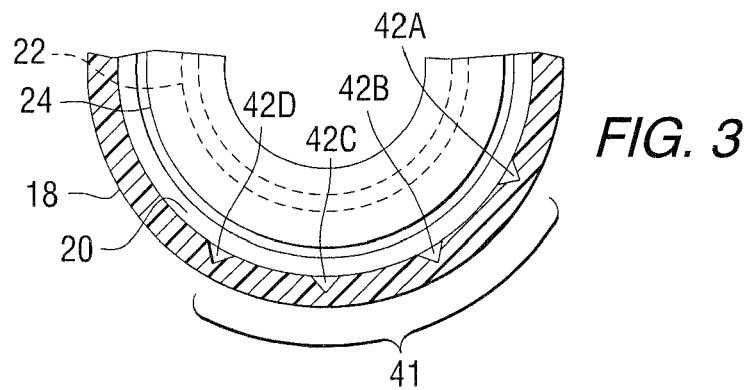
FIG. 3 is a view of the female part of the coupling taken generally along lines 3-3 of FIG. 1.
Figure 4:
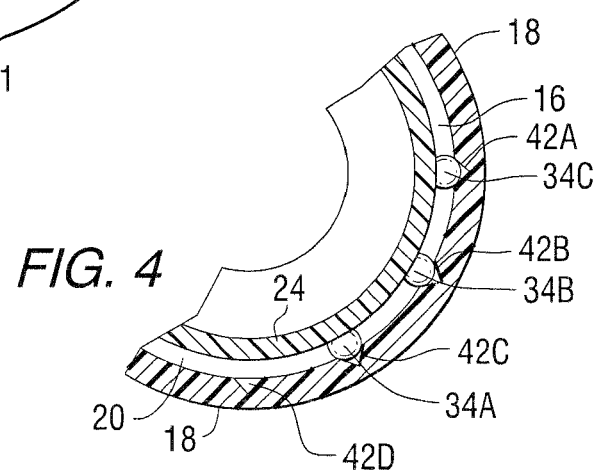
FIG. 4 is a view taken generally along lines 4-4 of FIG. 2.

The female part 18 has a leading thread portion 38. The trailing or last-to-be connected female thread portion is identified at 40. As best seen in FIG. 3 in one embodiment the female part 18 has a constant outside diameter. At least one detent 42 is located along the internal threads 20 between the leading thread portion 38 and the last-to-be connected female thread portion 40. It is understood that at least one detent may be positioned adjacent to the internal threads 20 in advance of the leading thread portion 38 or trailing the last-to-be connected female thread portion 40 in the direction of rotation (Arrow B). In one embodiment the invention contains four detents.

Accordingly, it should be appreciated that when a threaded connection is made, the detents 42 of the threaded female part 18 pass over the thread portion 30 on the leading end of the male part. The threading continues unimpeded until the first projection 34A encounters the leading thread portion 38 of the internal threads 20.

As finger tightening continues, the first projection 34A starts to bind against the inside surface of the internal threads 20 and then snaps into the first detent 42A. The snapping of the projection into a detent produces an audio response as well as a tactile sensation that the user can "feel," both indicating that the coupling is close to being made.

As tightening continues still further, the first projection 34A is forced out of the first detent 42A and over into the second detent 42B while the second projection 34B first encounters the leading thread portion 38 of the internal threads 20 and then enters the first detent 42A. With two projections bearing against the inside surface of the internal threads 20, the force required to tighten the coupling increases. This increase in the force needed to tighten the coupling as well as the tactile response each time a projection enters a detent cooperate to let the user know that the point is being reached where there is a danger of over tightening the coupling.

Tightening the coupling still further forces the two projections, 34A and 34B, from their respective detents 42B and 42A, and brings all three of the projections to bear against the inner surface of the internal threads 20. This increases still further the force required to finger tighten the male and female parts together. Eventually all three of the projections 34 will be captured in detents 42.

While in the embodiment as described the number of detents exceeds the number of projections, it is understood that the number of projections and detents can be equal. Also, the cooperating members can be such that the projections are along the threads of the female part and the detents along the treads of male part. Additionally, the cooperating members may be mixed with both projections have a convex surface and detents having a concave surface on either of the male or female parts. It is further understood that the cooperating members may be located along any portion of the threads, including the crest, flank or root.

Figure 5:
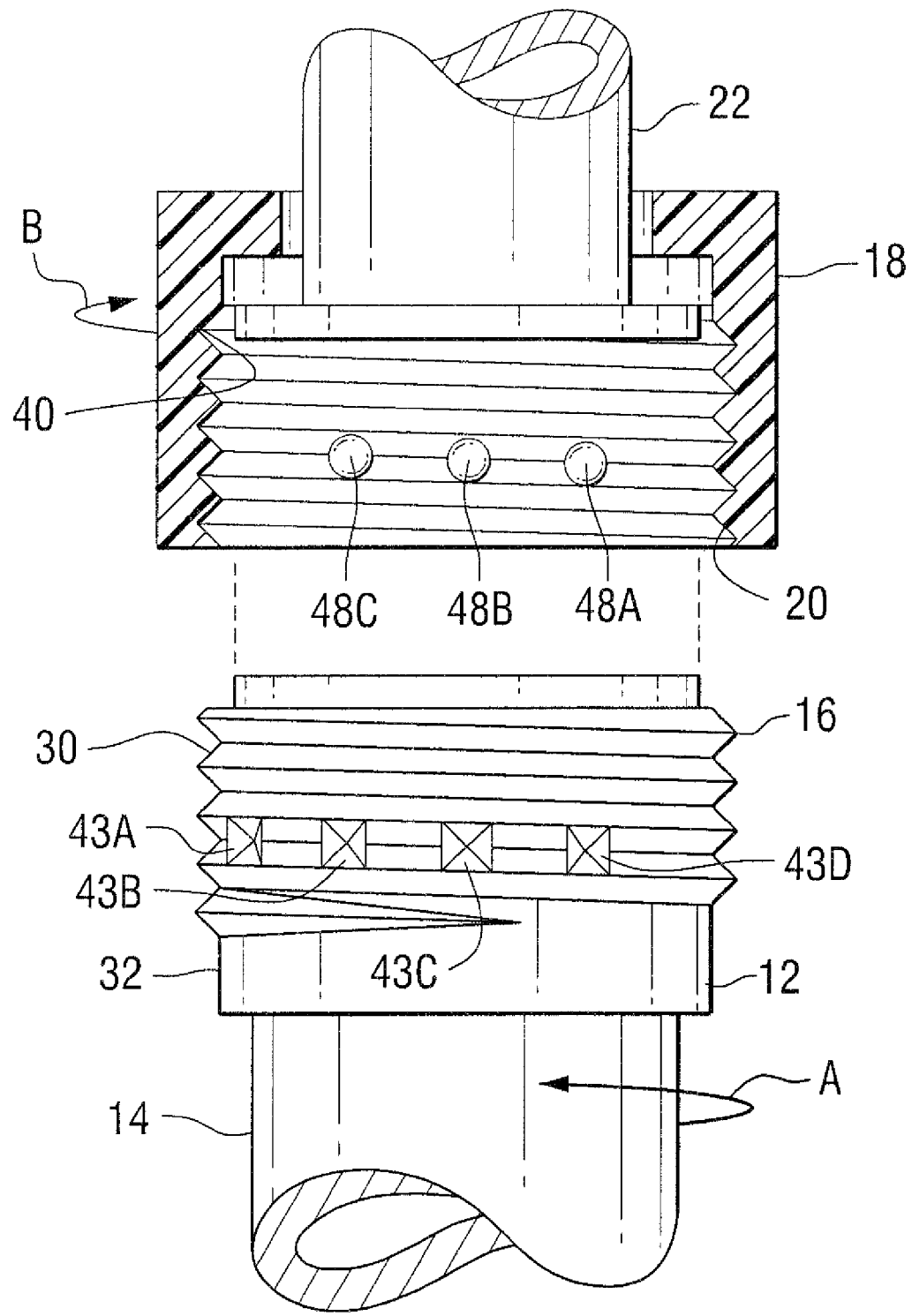
FIG. 5 is a front elevation view partly broken away and in section showing components of the self lock threaded coupling of an alternative embodiment of the present invention prior to assembly.

Referring to FIG. 5 there is shown an alternative embodiment of the instant invention. The coupling includes a male part 12 comprising a pipe section 14 having exterior threads 16 at one end and a female part 18 having internal threads 20. The female part 18 is threaded to the external threads 16 on the male part so as to couple the threaded pipe section 22 to the pipe section 14.

The male part 12 has an entry threaded portion 30 on a leading end and a trailing or last-to-be-engaged threaded portion 32. Along the external threads 16 are a series of detents 43. At least one detent 43 is located between the entry threaded portion 30 and the trailing or last-to-be-engaged threaded portion 32. It is understood that at least one detent may be positioned adjacent to the external threads 16 in advance of the entry threaded portion 30 or trailing the last-to-be-engaged threaded portion 32 in the direction of rotation (Arrow A).

The female part 18 has a leading thread portion 38. The trailing or last-to-be connected female thread portion is identified at 40. At least one projection 48 is located along the internal threads 20 between the leading thread portion 38 and the last-to-be connected female thread portion 40. It is understood that at least one projection may be positioned adjacent to the internal threads 20 in advance of the leading thread portion 38 or trailing the last-to-be connected female thread portion 40 in the direction of rotation (Arrow B).

The male part 12 and the female part 18 mate together as described in the previous embodiment. The projections 48 bear against the outer surface of the exterior threads 16 until the projections 48 snap into the detents 43, indicating that the connection is near over-tightening.

Figure 6:
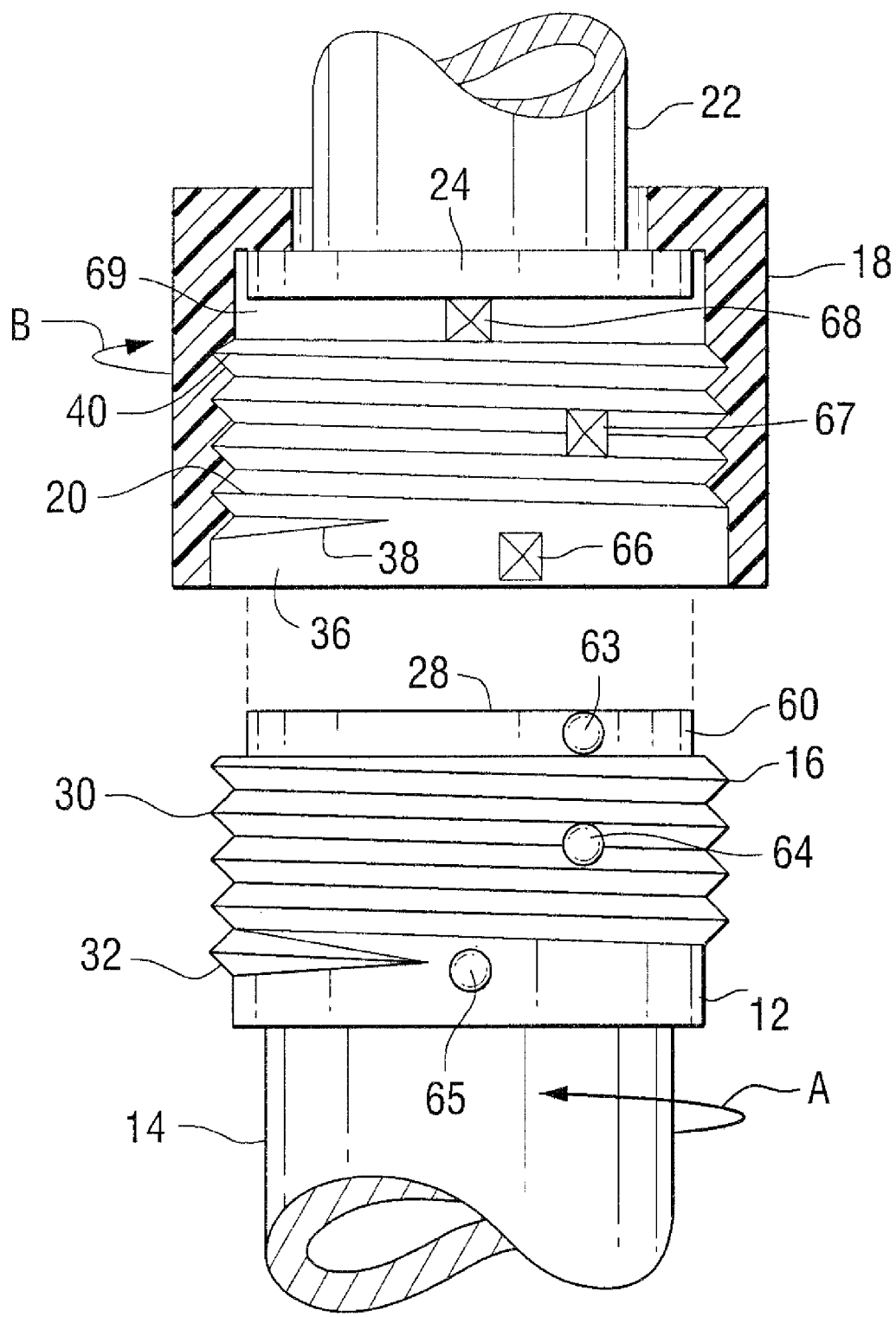
FIG. 6 is a front elevation view partly broken away and in section showing components of the self lock threaded coupling of an alternative embodiment of the present invention prior to assembly.
Figure 7A:
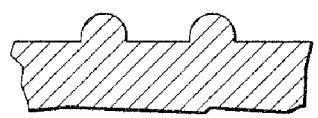
FIG. 7 is a schematic drawing showing various shaped projections.
Figure 7B:
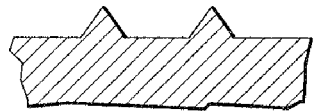
Figure 7C:
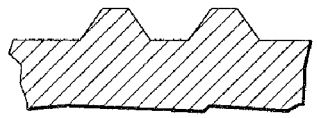
Figure 7D:
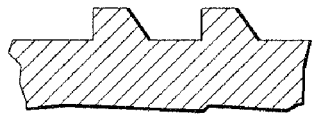
Figure 7E:
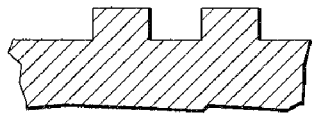
Figure 7F:
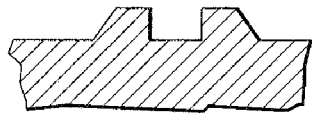

Referring to FIG. 6 there is shown another alternative embodiment of the instant invention. The coupling includes a male part 12 comprising a pipe section 14 having exterior threads 16 at one end and a female part 18 having internal threads 20. The female part 18 is threaded to the external threads 16 on the male part so as to couple the threaded pipe section 22 to the pipe section 14.

The male part 12 has an entry threaded portion 30 on a leading end and a trailing or last-to-be-engaged threaded portion 32. In advance of the entry threaded portion 30 is a lip 60. At lest one protrusion 64 is along the external threads 16 between the entry threaded portion 30 and the trailing or last-to-be-engaged threaded portion 32. At least one advance protrusion 63 is positioned on the lip 60 in advance of the entry threaded portion 30. At least one trailing protrusion 65 is positioned on the portion trailing the last-to-be-engaged threaded portion 32.

The female part 18 has an entry lip 36 and the leading thread 38 of the female part starts slightly inboard of the entry lip 36. The trailing or last-to-be connected female thread portion is identified at 40. A trailing lip 69 is positioned trailing the last-to-be connected female thread portion 40 in the direction of rotation (Arrow B). At least one detent 67 is located along the internal threads 20 between the leading thread portion 38 and the last-to-be connected female thread portion 40. At least one leading detent 66 is positioned along the entry lip 36. At least one trailing detent 68 is positioned along the trailing lip 69. It is understood that in additional embodiments the projections and detents may be interchanged between the male and female parts and that the cooperating members may be positioned along the threaded portion and along the threaded portion, trailing the threaded portion, or any combination thereof.

FIG. 7 shows a variety of projections that could be alternatively used. The types shown include round shaped projections of FIG. 7a; triangular shaped projections of FIG. 7b; trapezoidal projections of FIG. 7c; semi trapezoidal projections of FIG. 7d; rectangular projections of FIG. 7e; and another projection shown in FIG. 7f with non-symmetrical projections.

Figure 8:
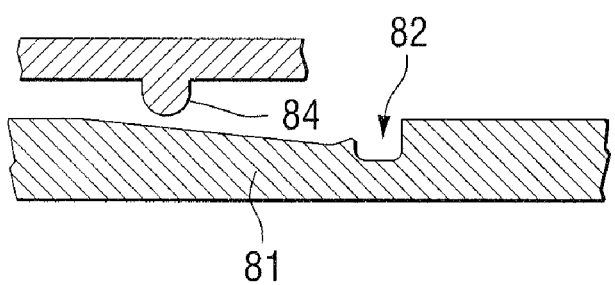
FIG. 8 is a schematic drawing showing a tapered thicker section.

Referring to FIG. 8 there is shown an alternative detent tapering area 81 with a detent 82. The area in advance of the detent 82 narrows towards the detent forming a taper. The projection 84 may easily move down the tapered area and lock into place when in cooperation with the detent 82.

Figure 9:
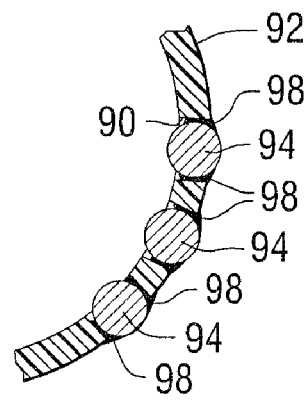
FIG. 9 is a cross sectional view of the male member showing another embodiment of the invention.

FIG. 9 shows another embodiment of the invention showing how the projections, rather than being formed integral the male part, may be embedded into the wall of the male part. In this respect FIG. 9 shoes that the holes 90 are drilled through the wall 92 of the male part. Convex element 94, such as a ball bearing or the like, is placed into the holes, the diameter of the convex element being smaller than the diameter of the holes. Then an adhesive such as an epoxy or the like is applied as shown at 98 to hold the spheres in place. In this embodiment the material of the convex elements 94 is preferably harder than the material of the male and female parts. With this arrangement there is less wear of the projections when a coupling is made and this in turn allows for more repeated connecting and disconnecting of the coupling before the amount detents wear to the point that the snap fitting loses its effectiveness.

Accordingly, as the pipe collar 24 and the end face 28 of the male part are brought together to make a junction as shown in FIG. 2. the force required to thread the male and female parts together is at a maximum. As noted above the capture of the projections can be both felt and heard as a "snap" so both tactile and audio signals alert the user that the male and female parts are close to being fully tightened and that further tightening may result in an over tightening of the parts to the point of damaging the threads on either the male or female parts. Theses tactile and audio signals provide cautionary signals in addition to the increase in the resistive force that is felt during the finger tightening. Also, since one or more of the projections 34 are captured in one or more of the detents 42, there is less of a likelihood of the coupling being separated by vibration.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A self-locking threaded connector comprising:
   a. a male part comprising a cylindrical inner wall forming a fluid passageway and a cylindrical outer wall, concentric to said inner wall, having external threads with one or more cooperating members interspaced along the external threads;
   b. a female part comprising internal threads along a cylindrical inner wall having one or more cooperating members interspaced along the internal threads, such that when the female and male parts mate together, the cooperating members on the threads of the male part engage the cooperating members on the threads of the female part to resist loosening of the threaded connection;
   wherein at least one of the male or female parts is made of a resilient material.

2. The self-locking threaded connector of claim 1 wherein the mating of said male and female parts provides an audio signal indicating the approach of thread-damaging over tightening.

3. The self-locking threaded connector of claim 1 wherein the mating of said male and female parts provides an tactile signal indicating the approach of thread-damaging over tightening.

4. The self-locking threaded connector of claim 1 wherein the cooperating members interspaced along the external threads of said male part are projections and the cooperating members interspaced along the internal threads of the female part are detents.

5. The self-locking threaded connector of claim 4 wherein the number of detents on said female part exceeds the number of projections on said male part.

6. The self-locking threaded connector of claim 4 wherein the projections are angular.

7. The self-locking threaded connector of claim 1 wherein said male part is a pipe.

8. The self-locking threaded connector of claim 1 wherein the cooperating members interspaced along the external threads of said male part are detents and the cooperating members interspaced along the internal threads of the female part are projections.

9. The self-locking threaded connector of claim 8 wherein the number of detents exceeds the number of projections by one.

10. A threaded connector comprising:
    a. a male part having an inner cylindrical wall defining a fluid passageway and external threads including an entry thread portion on a leading end of the male part and a trailing thread portion;
    b. a female part having internal threads extending along the female part including a leading thread portion and a trailing thread portion, the male and female parts being screwed together finger tight to effect a seal at the leading end of the male part;
    c. cooperating members along a portion of said male part and a portion of said female part, the cooperating members engaging one another upon a seal being effected between the male and female parts;
    d. wherein said cooperating members comprising means for preventing the over tightening of the male and female parts and for preventing vibration induced loosening of the male and female parts; and
    e. wherein at least one cooperating member is along the external threads of said male part and at least one cooperating member is along the internal threads of said female part;
    wherein at least one of the male or female parts is made of a resilient material.

11. The threaded coupling of claim 10 wherein said cooperating members include at least one projection on the male part and at least one detent in the female part.

12. The threaded coupling of claim 11 wherein the number of detents exceed the number of projections.

13. The threaded coupling of claim 10 wherein said cooperating members include at least one projection on said female part and at least one detent in said male part.

14. The threaded coupling of claim 13 wherein said at least one projection is a projection with a convex surface.

15. The threaded coupling of claim 10 where said male part is a pipe.

16. A method for connecting a self-locking threaded connector comprising:
    aligning a female part, having internal threads along a cylindrical inner wall and at least one cooperating member interspaced along the threads, with a male part, having a cylindrical inner wall forming a fluid passageway, and a cylindrical outer wall having external threads with at least one cooperating member interspaced along the external threads; and mating the male and female parts together by rotating the male or female part until the cooperating members on the threads of the male part engage the cooperating members along the threads of the female part to resist loosening of the threaded connection;

wherein at least one of the male or female parts is made of a resilient material.

* * * * *